(12) United States Patent
Flick

(10) Patent No.: US 6,346,876 B1
(45) Date of Patent: *Feb. 12, 2002

(54) MULTI-VEHICLE COMPATIBLE CONTROL SYSTEM GENERATING COMMAND SIGNALS ON A DATA BUS AND ASSOCIATED METHODS

(76) Inventor: Kenneth E. Flick, 5236 Presley Pl., Douglasville, GA (US) 30135

( * ) Notice: Subject to any disclaimer, the term of this patent is extended or adjusted under 35 U.S.C. 154(b) by 0 days.

This patent is subject to a terminal disclaimer.

(21) Appl. No.: 09/583,332

(22) Filed: May 31, 2000

Related U.S. Application Data

(63) Continuation-in-part of application No. 09/382,245, filed on Aug. 25, 1999, now Pat. No. 6,275,147, which is a continuation of application No. 09/023,838, filed on Feb. 13, 1998, now Pat. No. 6,011,460, which is a continuation-in-part of application No. 08/701,356, filed on Aug. 22, 1996, now Pat. No. 5,719,551.

(51) Int. Cl.[7] .............................................. B60R 25/10
(52) U.S. Cl. ...................... 340/426; 340/531; 340/533; 307/10.2; 180/287
(58) Field of Search .............................. 340/426, 425.5, 340/428, 429, 430, 576, 539, 825.69, 531, 533, 534; 180/167, 287; 307/10.2, 10.3, 10.4, 10.5

(56) References Cited

U.S. PATENT DOCUMENTS

| | | | |
|---|---|---|---|
| 4,055,772 A | 10/1977 | Leung | 307/10 R |
| 4,236,594 A | * 12/1980 | Ramsperger | 180/167 |
| 4,288,778 A | 9/1981 | Zucker | 340/64 |
| 4,538,262 A | 8/1985 | Sinniger et al. | 370/85 |
| 4,697,092 A | 9/1987 | Roggendorf et al. | 307/10 R |
| 4,754,255 A | 6/1988 | Saunders et al. | 340/64 |
| 4,760,275 A | 7/1988 | Sato et al. | 307/10 R |
| 4,792,783 A | 12/1988 | Burgess et al. | 340/22 |
| 4,794,368 A | * 12/1988 | Grossheim et al. | 340/527 |
| 4,841,159 A | 6/1989 | Evans et al. | 307/38 |

(List continued on next page.)

FOREIGN PATENT DOCUMENTS

| | | | |
|---|---|---|---|
| DE | 195 30 721 A1 | 2/1997 | H02J/9/04 |
| EP | 0 699 562 A2 | 7/1995 | B60R/16/02 |
| WO | WO 97/28988 | 8/1997 | B60R/16/02 |

OTHER PUBLICATIONS

Society of Automotive Engineers, Inc., "Surface Vehicle Information Report," SAE J2058 (Jun. 21, 1990).

Mark Thompson, "The Thick and Thin of Car Cabling," *IEEE Spectrum*, pp. 42–45 (2/96).

*Primary Examiner*—Daniel J. Wu
*Assistant Examiner*—Toan Pham
(74) *Attorney, Agent, or Firm*—Allen, Dyer, Doppelt, Milbrath & Gilchrist, P.A.

(57) ABSTRACT

A control system includes a transmitter and a receiver for receiving signals from the remote transmitter, and a multi-vehicle compatible controller cooperating with the transmitter and receiver. The multi-vehicle compatible controller preferably generates at least one set of command signals on the data communications bus for the at least one vehicle device. The at least one set of command signals may include at least one working command signal and at least one non-working command signal for a given vehicle to thereby provide compatibility with a plurality of different vehicles. Multiple signals or codes can be generated on the data communications bus, and only that code for the given vehicle will cause an operation or response from the vehicle device. Such an arrangement provides for a relatively simple and straightforward approach to interface with a vehicle having a data communications bus. The features are also readily implemented in an adaptor to use with conventional security or other control system controllers for vehicles.

51 Claims, 8 Drawing Sheets

U.S. PATENT DOCUMENTS

| | | | |
|---|---|---|---|
| 4,926,332 A | 5/1990 | Komuro et al. | 364/424.05 |
| 5,006,843 A | 4/1991 | Hauer | 340/825.31 |
| 5,040,990 A | 8/1991 | Suman et al. | 439/34 |
| 5,046,041 A | 9/1991 | Lecocq et al. | 364/900 |
| 5,049,867 A | 9/1991 | Stouffer | 340/426 |
| 5,054,569 A * | 10/1991 | Scott et al. | 180/167 |
| 5,081,667 A | 1/1992 | Drori et al. | 379/59 |
| 5,142,278 A | 8/1992 | Moallemi et al. | 340/825.06 |
| 5,146,215 A | 9/1992 | Drori | 340/825.32 |
| 5,243,322 A | 9/1993 | Thompson et al. | 340/429 |
| 5,252,966 A | 10/1993 | Lambropoulos et al. | 340/825.69 |
| 5,406,270 A | 4/1995 | Van Lente | 340/825.34 |
| 5,473,540 A | 12/1995 | Schmitz | 701/1 |
| 5,475,818 A | 12/1995 | Molyneaux et al. | 395/200.05 |
| 5,521,588 A | 5/1996 | Kuhner et al. | |
| 5,523,948 A | 6/1996 | Adrain | |
| 5,555,498 A | 9/1996 | Berra et al. | 364/424.03 |
| 5,606,306 A | 2/1997 | Mutoh et al. | 340/426 |
| 5,612,578 A * | 3/1997 | Drew | 307/10.5 |
| 5,619,412 A * | 4/1997 | Hapka | 364/424.045 |
| 5,673,017 A * | 9/1997 | Dery et al. | 340/426 |
| 5,719,551 A * | 2/1998 | Flick | 340/426 |
| 5,757,086 A * | 5/1998 | Nagashima | 307/10.6 |
| 5,808,564 A * | 9/1998 | Simms et al. | 340/990 |
| 5,818,330 A * | 10/1998 | Schweiger | 340/426 |
| 5,832,397 A | 11/1998 | Yoshida et al. | 701/29 |
| 5,838,255 A * | 11/1998 | Di Croce | 340/825.69 |
| 5,912,512 A * | 6/1999 | Hayashi et al. | 307/10.5 |
| 6,011,460 A * | 1/2000 | Flick | 340/426 |
| 6,275,147 B1 * | 8/2001 | Flick | 340/426 |

* cited by examiner

MULTI-VEHICLE COMPATIBLE CONTROL SYSTEM GENERATING COMMAND SIGNALS ON A DATA BUS AND ASSOCIATED METHODS

RELATED APPLICATIONS

The present application is a continuation-in-part of U.S. patent application Ser. No. 09/382,245 filed Aug. 25, 1999, U.S. Pat. No. 6,275,147 which in turn, is a continuation of Ser. No. 09/023,838 now U.S. Pat. No. 6,011,460, filed Feb. 13, 1998 which in turn, is a continuation-in-art of Ser. No. 08/701,356 now U.S. Pat. No. 5,719,551 filed Aug. 22, 1996.

FIELD OF THE INVENTION

This application is related to the field of control systems and, more particularly, to a remote control system and related methods for vehicles.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

Unfortunately, the majority of vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to reduce cables to three or four wires and to simplify the exchange of data among the various onboard electronic systems as disclosed, for example, in "The Thick and Thin of Car Cabling" by Thompson appearing in the IEEE Spectrum, February 1996, pp. 42–45.

Implementing multiplexing concepts in vehicles in a cost-effective and reliable manner may not be easy. Successful implementation, for example, may require the development of low or error-free communications in what can be harsh vehicle environments. With multiplexing technology, the various electronic modules or devices may be linked by a single signal wire in a bus also containing a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

Unfortunately, conventional vehicle control systems, such as aftermarket vehicle security systems, are for hardwired connection to vehicle devices and are not readily adaptable to a vehicle including a data communications bus. Moreover, a vehicle security system if adapted for a communications bus and devices for one particular model, model year, and manufacturer, may not be compatible with any other models, model years, or manufacturers. Other systems for the control of vehicle functions may also suffer from such shortcomings.

SUMMARY OF THE INVENTION

In view of the foregoing background it is therefore an object of the invention to provide a control system and related method for a vehicle comprising a data communications bus and at least one vehicle device connected to the data communications bus, and wherein the system is adapted to operate with different vehicles.

This and other objects, features and advantages in accordance with the invention are provided by a vehicle control system including a transmitter and a receiver for receiving signals from the transmitter, and a multi-vehicle compatible controller cooperating with the transmitter and receiver. The multi-vehicle compatible controller preferably generates at least one set of command signals on the data communications bus for the at least one vehicle device. The at least one set of command signals preferably comprises at least one working command signal and at least one non-working command signal for a given vehicle to thereby provide compatibility with a plurality of different vehicles. In other words, multiple signals or codes can be generated on the data communications bus, and only that code for the given vehicle and device will cause an operation or response from the vehicle device. Such an arrangement provides for a relatively simple and straightforward approach to interface with a vehicle having a data communications bus.

The at least one vehicle device may, of course, comprise a plurality of vehicle devices. Accordingly, the multi-vehicle compatible controller may generate a respective set of command signals for each of the vehicle devices. In one embodiment, the multi-vehicle compatible controller generates the different command signals sequentially. Of course, the multi-vehicle compatible controller may preferably generate command signals, with each representing digitally coded information, and the multi-vehicle compatible controller may include a memory for storing data relating to the command signals.

The remote control system may be for vehicle security, remote keyless entry, or remote vehicle starting, or combinations of such features, for example. More particularly, the at least one vehicle device may comprise an alarm indicating device, and the at least one set of command signals may be for operating the alarm indicating device. The at least one vehicle device may be one or more door lock actuators, and the at least one set of command signals may be for operating the door lock actuators. In addition, the at least one vehicle device may comprise at least one device relating to starting a vehicle engine, and the at least one set of command signals may be for operating such a device.

In accordance with another aspect of the invention, the multi-vehicle compatible controller may generate each command signal of a set of command signals a plurality of times. This may ensure that the signal is received even when there is other data traffic on the data communications bus.

The multi-vehicle compatibility concept may be extended to an adaptor device, such as for after-market installation, and may be especially advantageous when used in combination with a conventional vehicle function controller. In other words, the multi-vehicle compatible controller may comprise a controller, such as a conventional security, keyless entry, or remote start controller, and a multi-vehicle adaptor connected to the controller. The multi-vehicle adaptor may generate the at least one set of command signals on the data communications bus responsive to a signal from the controller.

The control system can be operated directly by the user, or via an intervening communications network. In other words, in some embodiments, the transmitter may be a remote handheld transmitter to be carried by a user when away from the vehicle, and the receiver is at the vehicle. In other embodiments, the transmitter may include at least a central station transmitter, and the receiver is at the vehicle. The central station transmitter may be part of a satellite or cellular telephone network.

In yet other embodiments, the receiver may be a handheld unit carried by the user or a central station receiver, such as to notify the user or others of a vehicle security breach, for example. In these embodiments, the transmitter is then located at the vehicle.

The multi-vehicle compatible controller may, in some embodiments, also be for reading signals on the data communications bus. This reading function may also have multi-vehicle compatibility.

A method aspect of the invention is directed to a control method for a vehicle comprising a data communications bus and at least one vehicle device connected to the data communications bus. The method preferably comprises generating at least one set of command signals on the data communications bus for the at least one vehicle device and wherein the at least one set of command signals preferably comprises at least one working command signal and at least one non-working command signal for a given vehicle to thereby provide compatibility with a plurality of different vehicles. The method may also include receiving signals at the vehicle from a remote transmitter, and the generation of command signals may be further based on receiving such signals.

Another method aspect of the invention is for adapting a control system for a vehicle to be compatible with different vehicles, wherein each vehicle includes a data communications bus and at least one vehicle device connected to the data communications bus. The control system preferably includes a transmitter and a receiver for receiving signals from the transmitter, and a controller cooperating with the transmitter and receiver. The method for adapting preferably comprises monitoring an output of the controller, and generating at least one set of command signals on the data communications bus responsive to the output of the controller. Again, the at least one set of command signals preferably includes at least one working command signal and at least one non-working command signal for a given vehicle to thereby provide compatibility with a plurality of different vehicles.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime and multiple prime notation are used in alternate embodiments to indicate similar elements.

Figure 1:
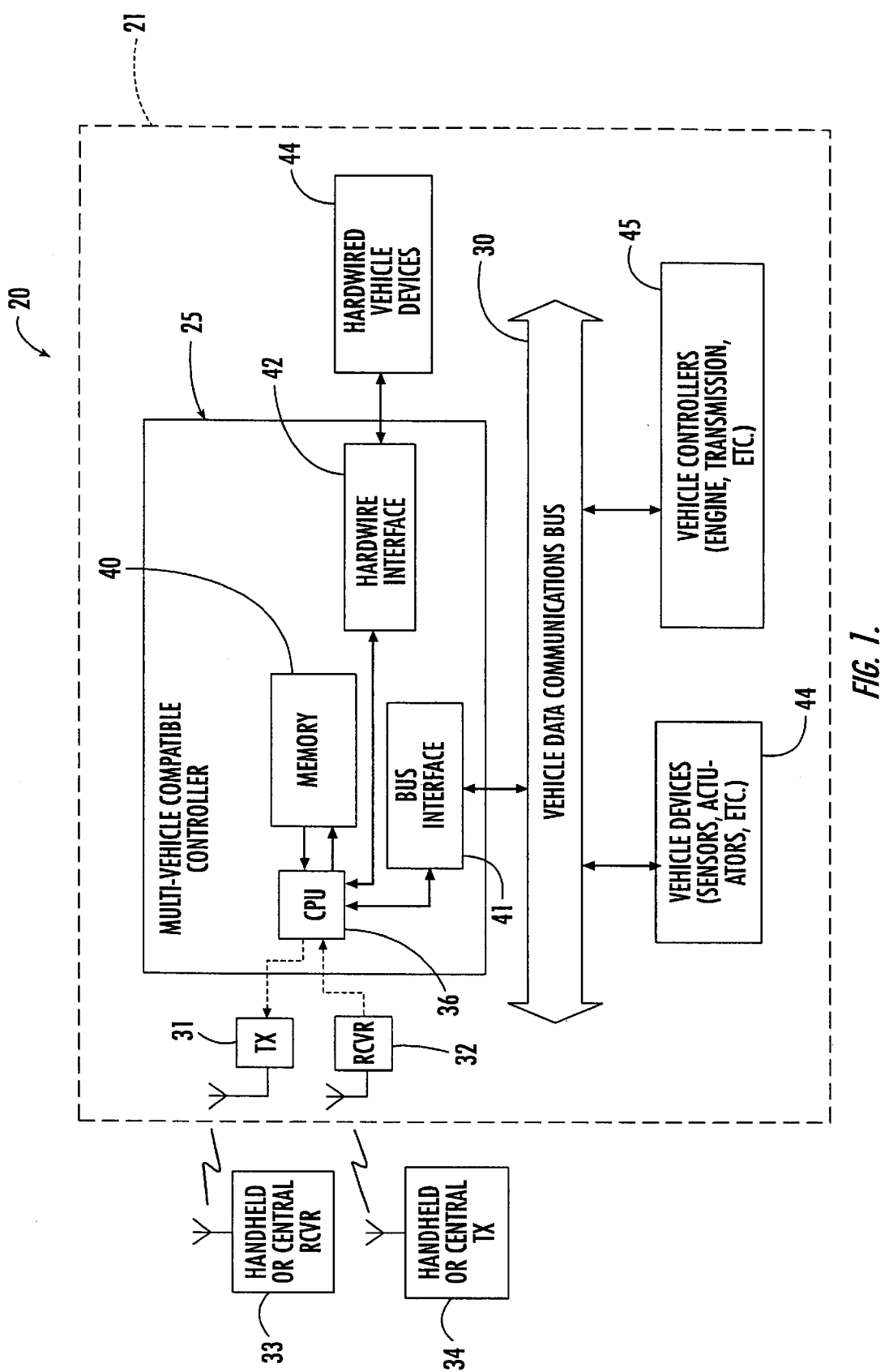
FIG. 1 is a schematic block diagram of a vehicle control System including the multi-vehicle compatible controller connected to a data communications bus and other hardwired devices in accordance with the invention.

Referring initially to FIG. 1, a control system 20 for a vehicle 21 is now described. The control system includes a multi-vehicle compatible controller 25 connected to a data communications bus 30 in the vehicle 21. The data communications bus 30 may be any of several types, such as compatible with the J1850 or CAN standards, or other type of bus as will be appreciated by those skilled in the art. The multi-vehicle compatible controller 25, as its name suggests, provides compatibility with different codes used on the data bus and which may vary by vehicle as described in greater detail below.

The control system 20 preferably includes a transmitter, and a receiver for receiving signals from the transmitter. As shown in the illustrated embodiment, both a transmitter 31 and a receiver 32 are provided at the vehicle 21. In addition, both a receiver 33 and a transmitter 34 are provided remotely or away from the vehicle. The first transmitter/receiver pair 31, 33 may be used, for example, to provide a remote alert or page to a user when away from the vehicle of a security breach at the vehicle, for example. The second transmitter/receiver pair 32, 34 may be used to cause a desired function to be performed at the vehicle, such as remote starting the engine, remotely unlocking the vehicle doors, or changing the mode of a security system between armed and disarmed modes, for example. Many other similar applications are contemplated by the present invention as will be appreciated by those skilled in the art. As will also be appreciated by those skilled in the art, in other embodiments, only one of these pairs of transmitters and receivers may be provided in the control system.

The remote transmitter 34 may be a small portable unit including a housing, function control switches carried by the housing, a battery within the housing, and the associated transmitter circuitry. This type of remote handheld transmitter is commonly used in conventional vehicle security systems, remote start systems, and remote keyless entry systems. The communications from the remote transmitter 34 to the receiver 32 at the vehicle is typically a direct radio frequency link, that is, there is no intervening communications links. However, in other embodiments, the remote transmitter 34 may indirectly communicate with the receiver 32 via other communications infrastructure, such as via satellite, or cellular communications, via the public switched telephone network (PSTN) and/or over the world wide web or Internet, as will be appreciated by those skilled in the art.

The remote transmitter 34 may also be a passive transponder type device, that takes power from an associated transponder reader as will be appreciated by those skilled in the art, and automatically transmits a signal to the reader. For example, the transponder may be of the type carried in conjunction with the vehicle keys, or may be embedded in the key as will be readily appreciated by those skilled in the art.

The remote transmitter 34 may also include one or more central station transmitters, such as may be provided by a satellite transmitter or cellular telephone transmitter, for example. Such a central station transmitter may also be connected to other communications infrastructure.

The remote receiver 33 may also be a small portable unit including a housing, one or more indicators carried by the housing, a battery within the housing, and the associated receiver circuitry. This type of remote receiver may also directly communicate with the vehicle transmitter 31, or there may be intervening communications links as will be appreciated by those skilled in the art. In some embodiments, the remote transmitter 34 and remote receiver 33 may be packaged together in a common handheld housing. Of course the remote receiver 33 may also include one or more central stations along the lines as described above for the central station remote transmitter.

The multi-vehicle compatible controller 25 may also include a central processing unit (CPU) 36 and one or more memories 40 connected thereto. Although the memory 40 is illustrated as a separate device, those of skill in the art will recognize that the memory may alternately be embedded on the same integrated circuit as the processing circuitry of the CPU.

The multi-vehicle compatible controller 25 also may optionally include a hardwire interface 42 which may be directly connected to one or more vehicle devices 44. For example, in some embodiments for a security system, direct connections may be made to one or more vehicle sensors, an indicator LED, a siren, or the headlight relay. For a remote start system, hardwire connections may be made to a starter motor relay, for example. Those of skill in the art will recognize other devices 44 that may be directly connected to the multi-vehicle compatible controller 25 via the hardwire interface 42. The hardwire interface 42 may included circuitry for sending signals to or reading signals from the vehicle devices 44 as will be appreciated by those skilled in the art. In some embodiments, the hardwire interface 42 may not be needed or incorporated in the multi-vehicle compatible controller 25.

The multi-vehicle compatible controller 25 also illustratively includes a bus interface 41 cooperating with the CPU 36 to perform at least one of reading signals from the data communications bus 30, or generating signals on the data bus. The bus interface 41 includes circuitry for interfacing to the proper signal levels and formats on the data communications bus 30 as will be appreciated by those skilled in the art without further discussion herein.

As will also be readily appreciated by those skilled in the art, the vehicle 21 includes a number of electrical/electronic devices that can be controlled and/or the status thereof read via the data communications bus 30. For simplicity of explanation, these devices are schematically illustrated by the two blocks 44, 45, respectively labeled "vehicle devices (sensors, actuators, etc.)," and "vehicle controllers (engine controller, transmission controller, etc.)." In other words, the vehicle devices connected to the data bus 30 may be considered to be relatively simple devices, such as sensors, or more complicated devices with some internal processing, such as may generally be considered as controllers.

Figure 2:
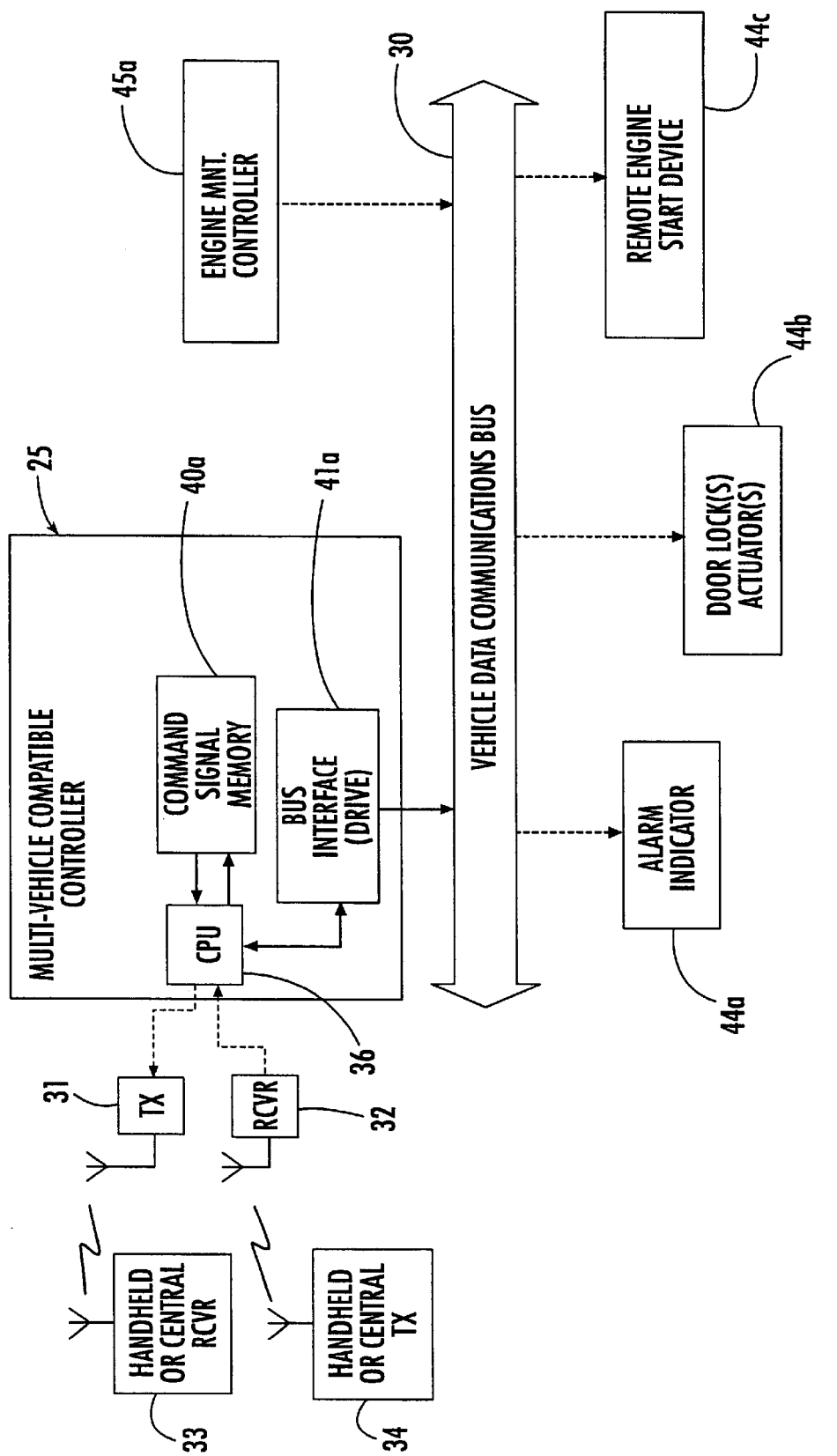
FIG. 2 is a more detailed schematic block diagram of an embodiment of the multi-vehicle compatible controller illustrating the command signal generation in accordance with the invention.
Figure 3:
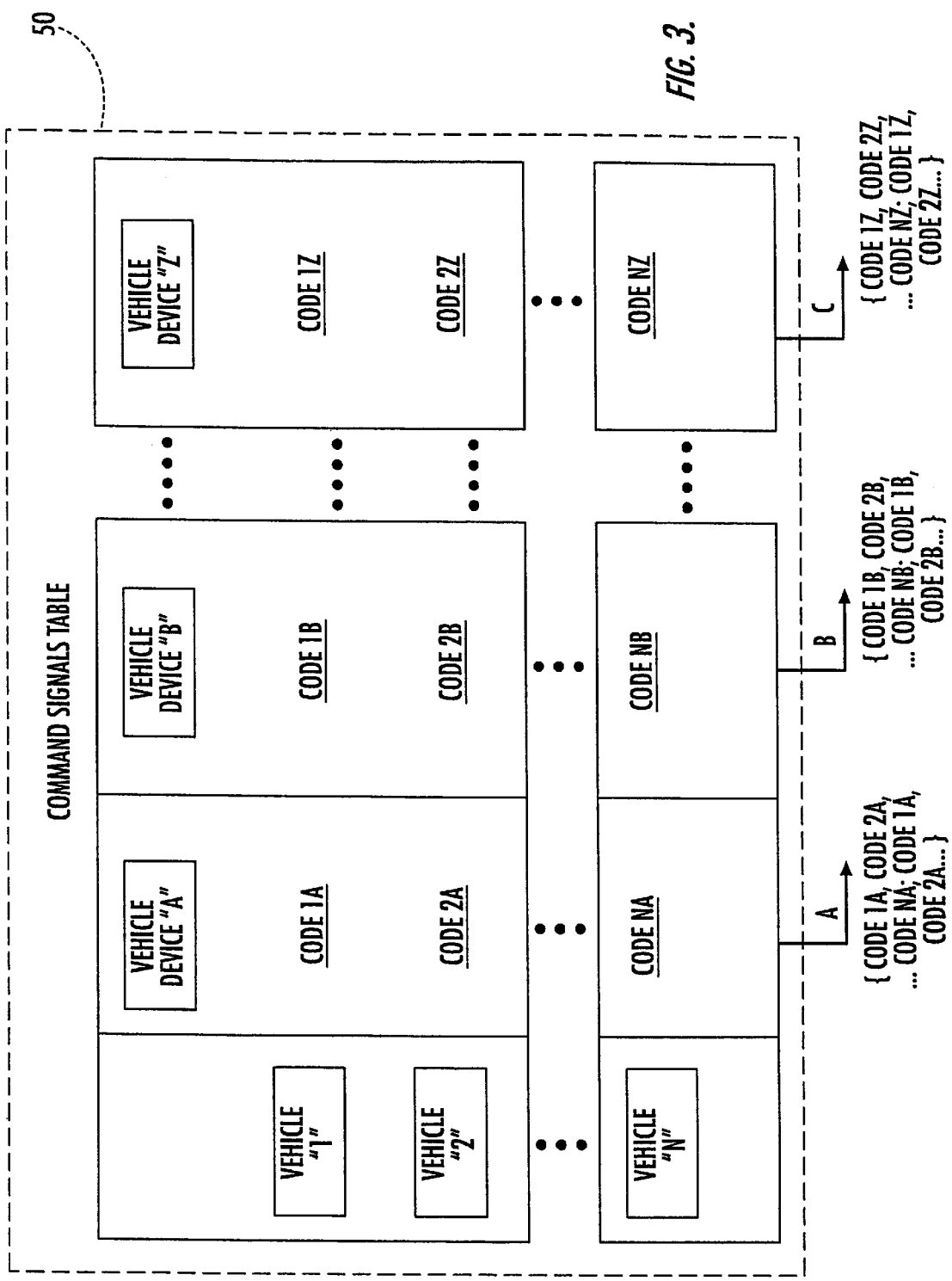
FIG. 3 is a schematic diagram illustrating processing of command signals by the multi-vehicle compatible controller of FIG. 2.

The multi-vehicle compatibility controller 25 may provide its multi-vehicle compatibility in one or both directions of communications via the data communications bus 30. Referring now additionally to FIGS. 2 and 3, the drive or generation of signals on the data bus portion of communication is now further described. In this embodiment, the multi-vehicle compatible controller 25' illustratively includes a command signal memory 40a, and a bus interface 41a only for the drive direction for simplicity of explanation.

The devices connected to the data communications bus 30 illustratively include an alarm indicator 44a, such as can be provided by a separate siren or the vehicle horn, for example. The alarm indicator 44a would likely be included for a security system. The vehicle devices may also include one or more door lock actuators 44b as would be likely used by a security system or remote keyless entry system, for example, as would be readily appreciated by those skilled in the art.

For a remote start system, one or more remote starting device 44c may be connected to the data communications bus 30 as shown in the illustrated embodiment. Such a remote starting device 44c may be a starter relay, for example, controlled by signals from the data communications bus. The remote starting device 44c could also be a device or circuit to bypass an engine immobilizer circuit as will be appreciated by those skilled in the art.

The vehicle device to which signals are to be sent by the multi-vehicle controller 25' may also include another controller, such as the schematically illustrated engine management controller 45a. The engine management controller 45a could be sent signals such as to prevent or enable starting for security or remote start applications as will be appreciated by those skilled in the art.

The multi-vehicle compatible controller 25' may also include an optional hardwire interface and other components as mentioned above. For clarity and simplicity of explanation, these components need no further description.

In accordance with this aspect of the invention, the multi-vehicle compatible controller 25' preferably generates at least one set of command signals on the data communications bus 30 for the at least one vehicle device. The at least one set of command signals preferably comprises at least one working command signal and at least one non-working command signal for a given vehicle to thereby provide compatibility with the plurality of different vehicles. In other words, multiple signals or codes can be generated on the data communications bus 30, and only that code for the given vehicle and device will cause an operation or response from the vehicle device. This provides for a relatively simple and straightforward approach to interface or cooperate with a vehicle having a data communications bus 30, and wherein the controller is advantageously compatible with a number of different vehicles. Since typically it may be desired to interface to a plurality of vehicle devices, the multi-vehicle compatible controller 25' may generate a respective set of command signals for each of the vehicle devices.

Such multi-vehicle compatibility provided by the controller 25' is especially advantageous in after-market systems, such as for security, remote keyless entry, or remote starting for example. The ability to interface through the data communications bus 30 also significantly reduces the wiring complexity needed to interface to the associated vehicle devices.

The multi-vehicle compatible controller 25' may sequentially generate the different command signals (working and non-working) for an intended vehicle device. To ensure effective communications even in the presence of noise, for example, the multi-vehicle compatible controller 25' may generate the set of command signals a plurality of times, such as, for example, two to five times. The need to effectively communicate should be balanced against possible traffic congestion on the data bus 30 as will be appreciated by those skilled in the art.

Referring now more specifically to the diagram of FIG. 3, the operation of the multi-vehicle controller 25' is further described. The controller 25' may operate by arranging in the command signals memory 40a a common table 50 as shown. The CPU 36 upon determining that an action needs to be performed, such as unlocking the driver's door, for example, would identify the appropriate column from the table 50 from among the columns labeled "vehicle device A" to "vehicle device Z". For example, the appropriate column may be "vehicle device B", in which case the CPU would then read the memory locations in this column to generate on the bus 30 the appropriate set of codes to lock the driver's door for each of the N vehicles with which the multi-vehicle compatible controller 25' is compatible. Of course, only one of the codes would be a working code, and the other codes would cause no vehicle function to be performed. For example, if vehicle 2 was the vehicle in which the multi-vehicle compatible controller 25' were installed, only the code 2B would cause the driver's door to unlock.

The actual coded signals would be compatible with the particular data communications bus 30 as will be appreciated by those skilled in the art. The codes may be binary codes, which for convenience can be represented more simply by corresponding hexadecimal codes as would also be appreciated by those skilled in the art. For example, for an unlock all vehicle doors to be commanded in a 1995 Jeep Grand Cherokee, the code may be 03868004, for a 2000 Jeep Grand Cherokee, the code may be 0422A00400. As will be readily appreciated by those skilled in the art, such codes can be obtained from the manufacturers directly, or may be read from the data bus 30 using any one of a number of commercially available diagnostic tools for reading the data bus 30, for example.

The set of command signals may be repeated as mentioned above, and as schematically illustrated at the lower portion of the table 50. Of course, the memory 40a may store the actual codes, but may also store data enabling generation of the set of command signals by the CPU 36. This may be particularly so where certain portions of the code, e.g. preamble, or some other portion, are common across either multiple vehicles, and/or over multiple vehicle devices.

The number of vehicles and number of devices to be controlled using the multi-vehicle compatible controller 25' can both be relatively large to cover a substantial portion of the vehicle marketplace. Alternatively, the multiple command signal concept may also be advantageously used to provide compatibility for as few as two vehicles, and even a single vehicle device.

Figure 4:
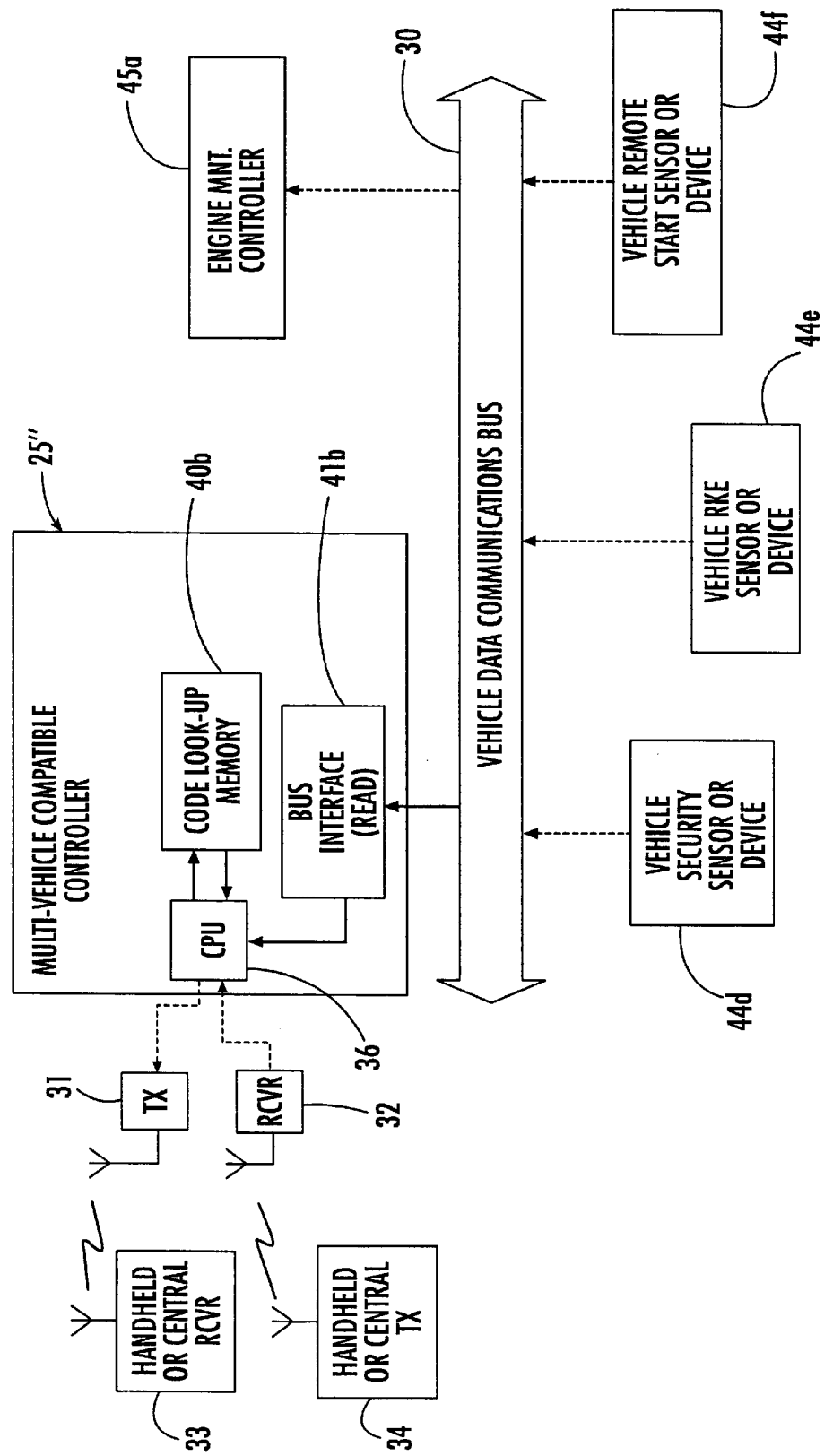
FIG. 4 is a more detailed schematic block diagram of an embodiment of the multi-vehicle compatible controller illustrating the code signal look-up in accordance with the invention.
Figure 5:
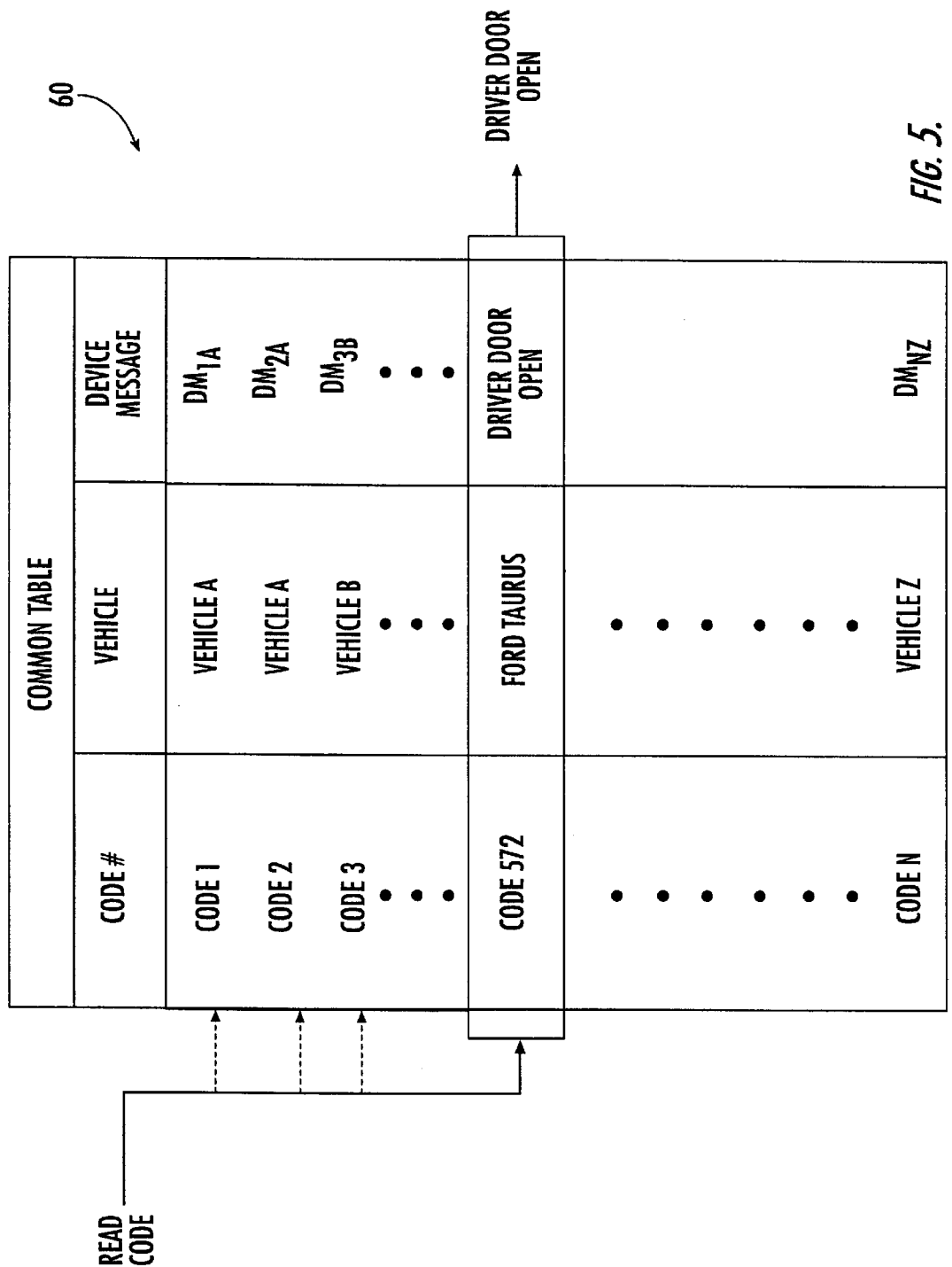
FIG. 5 is a schematic diagram illustrating processing of a code read from the data communications bus in accordance with a first embodiment of the multi-vehicle compatible controller of FIG. 4.
Figure 6:
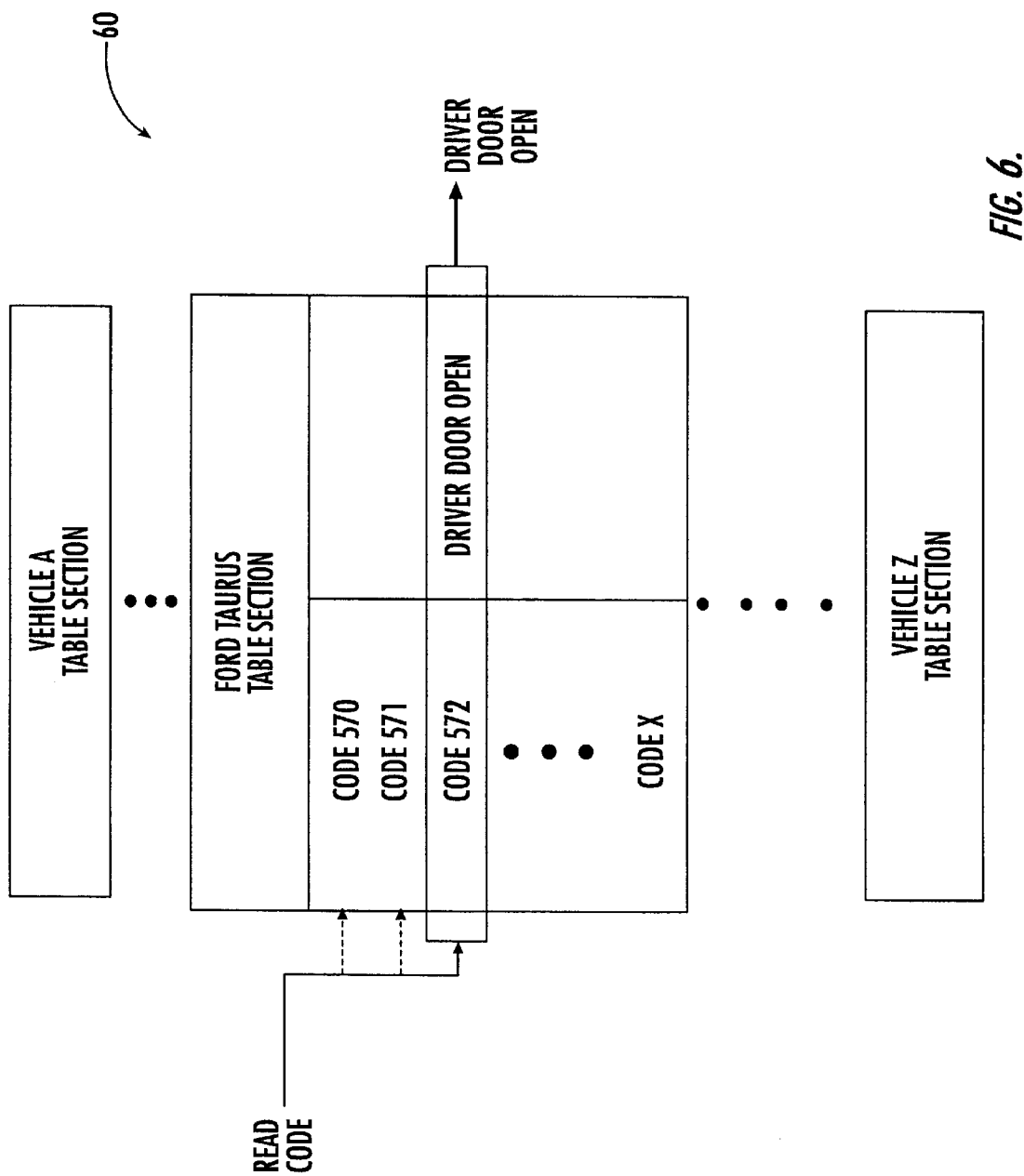
FIG. 6 is a schematic diagram illustrating processing of a code read from the data communications bus in accordance with a second embodiment of the multi-vehicle compatible controller of FIG. 4.

Turning now to FIGS. 4–6, the other direction of communication is now described. In particular, the reverse direction or reading of signals from the data communications bus 30 is now described. Many of the components are the same as those described above, and, hence, need no further description. In the illustrated embodiment, the CPU 36 is connected to a code look-up memory 40b. In addition, only the read or receive side of the bus interface 41b is schematically illustrated. The data bus 30 also illustratively connects one or more of vehicle security sensors or devices 44d, vehicle remote keyless entry sensors or devices, and vehicle remote start sensors or devices 44f to the multi-vehicle compatible controller 25". An engine management controller 45a is also illustratively connected to the data communications bus 30 as may be used for vehicle security or remote starting as mentioned above. Considered in somewhat different terms, the multi-vehicle compatible controller 25" may be for one or more of the conventional vehicle remote control functions broadly considered as vehicle security, remote keyless entry, or remote starting. Other similar control functions for a vehicle are also contemplated by the present invention.

The compatibility to read a code and determine the message or content thereof for a vehicle device from among a plurality of vehicles can be used alone or in combination with the compatibility for writing or generating signals on the bus described above. More particularly, the multi-vehicle compatible controller 25" is for storing a set of device codes for a given vehicle device for a plurality of different vehicles, for reading a device code from the data communications bus 30, and for determining a match between a read device code and the stored device codes to thereby provide compatibility with a plurality of different vehicles. Such an arrangement provides for a relatively simple and straightforward approach to interface with a vehicle having a data communications bus 30.

As noted briefly above, the multi-vehicle compatible controller 25" may comprise the code look-up memory 40b for the stored device codes, and a processor or CPU 36 cooperating with the memory for determining the match between the read device code and the stored device codes. The at least one vehicle device may include a plurality of vehicle devices, and, accordingly, the memory 40b of the multi-vehicle compatible controller 25" preferably stores a respective set of device codes for each of the plurality of vehicle devices.

Referring now more specifically to FIG. 5, the look-up table feature of the multi-vehicle compatible controller 25" is now described. A common table 60 may be created which contains a column for the vehicle codes in some predefined sequence, such as in a numerical order beginning with a first code, Code 1, and ending with a last code, Code N, as illustrated. The central column in the illustrated embodiment includes the corresponding vehicle identification with the vehicles extending from a first vehicle, Vehicle A, to a last vehicle, Vehicle Z. The number of codes and vehicles may be selected so that a given multi-vehicle compatible controller 25" is useable across an economically large number of vehicles as will be appreciated by those skilled in the art.

The last or rightmost column in the illustrated table 60 is the device data or message corresponding to the associated vehicle and code. These device messages extend from a first message, $DM_{1A}$, to a last device message, $DM_{NZ}$. The messages may be of many different types, such as driver door open or closed, hood open or closed, shock sensor triggered, brake pressure indicated, gearshift selector in Park, etc. as will be appreciated by those skilled in the art.

By way of example, the common table 60 includes a blocked row schematically illustrating a match for a Code 572. This code is for a Ford Taurus and indicates that the driver's door is open. This type of data may be useful in any of the illustrated implementations including vehicle security, remote keyless entry, or remote starting. The CPU 36 would read the code on the data bus 30 and compare the code against the stored codes to determine a match. The CPU 36 is likely to buffer some or all of a code when received to subsequently be compared using the table 60 as will be understood by those skilled in the art. In other embodiments, individual bits or blocks thereof may be compared as they are received.

An alternate embodiment of the common table 60 is now explained with reference to FIG. 6. In this case the overall or common table 60', may be considered parsed or divided into a plurality of vehicle table sections. The first table section is for vehicle A, and the last for vehicle Z in the illustrated embodiment. This embodiment also illustrates the driver door for the Ford Taurus as being matched from the read signal from the data communications bus 30. What is of interest in this embodiment, is that upon initial set-up or an initial learning period, only the codes for the learned vehicle need then later be compared to the read code. Accordingly, a time savings may be realized.

Those of skill in the art will recognize that the tables 60 and 60' of FIGS. 5 and 6 are exemplary illustrations from among many possible configurations of look-up tables that may be used in accordance with the present invention. Other configurations are also contemplated by the present invention.

Since it may also be desirable to re-install the multi-vehicle compatible controller 25" in another vehicle, the controller may be reset and another vehicle learned or configured during an initial set-up. This concept is generally described as an embodiment of a desired signal enabling function or feature in related parent U.S. patent application Ser. No. 09/382,245 filed Aug. 25, 1999, which in turn, is a continuation of U.S. Pat. No. 6,011,460, which in turn, is a continuation-in-part of U.S. Pat. No. 5,719,551, and the disclosure of each of which are incorporated herein by reference in its entirety.

Figure 7:
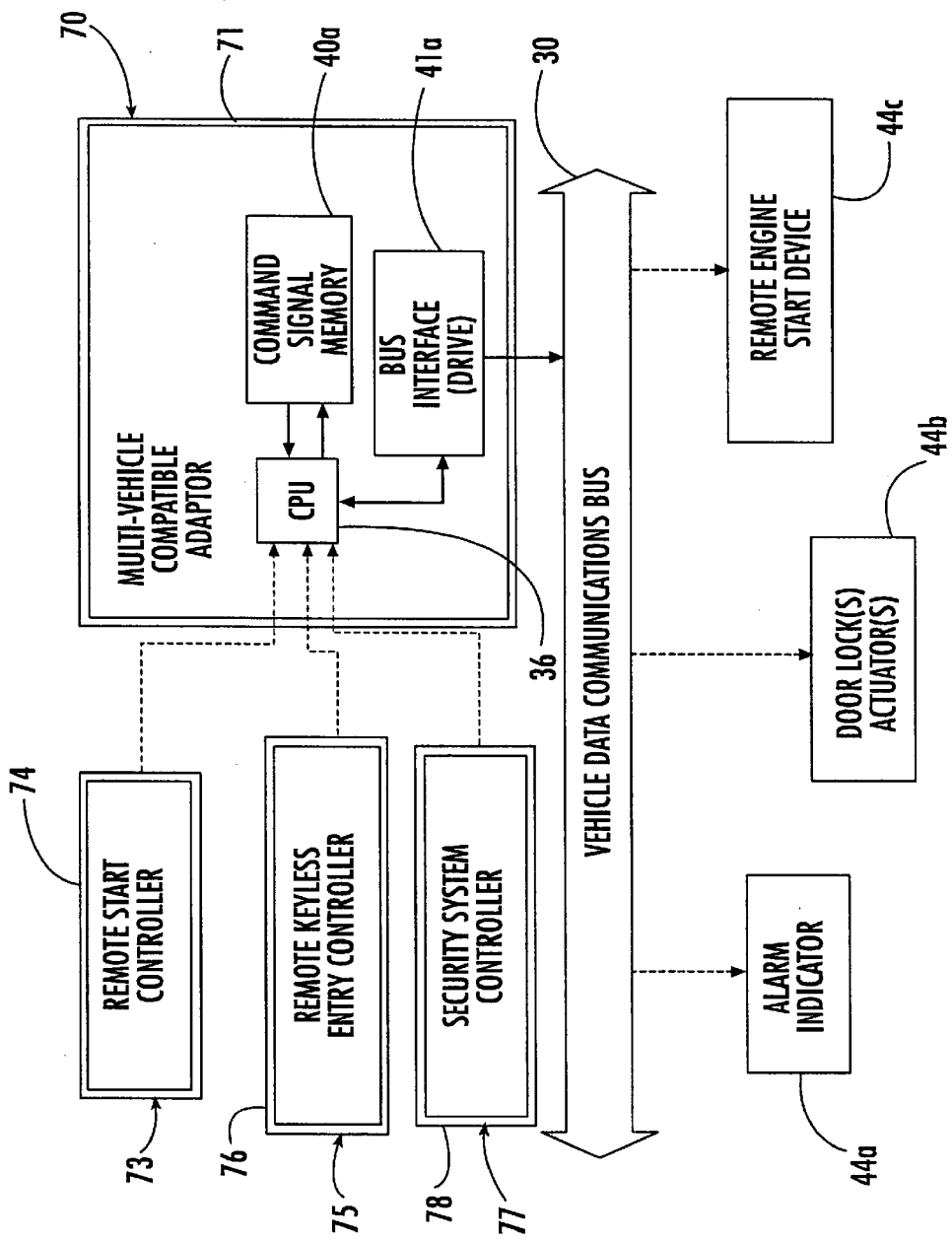
FIG. 7 is a schematic block diagram of a multi-vehicle compatible adaptor in accordance with the present invention and illustrating the command signal processing portion.

Turning now to FIG. 7, we again revisit the command signal concept for driving the communications bus 30 with a plurality of signal codes to provide the multi-vehicle compatibility. In this variation, the multi-vehicle controller is divided into two sections or portions. More particularly, the multi-vehicle compatibility is provided by the illustrated multi-vehicle compatible adaptor 70. The adaptor 70 illustratively includes the CPU 36, the command signal memory 40a, and the bus interface 41a. The adaptor 70 also includes its own housing 71. The adaptor 70, may include a hardwire interface as discussed above, or such could already be provided with any of the controllers 73, 75 or 77 as would more typically be the case.

The adaptor 70 is fed signals from one or more of the illustrated conventional controllers, that is, one or more of the remote start controller 73, the remote keyless entry controller 75 or the security system controller 77. Each of the these controllers 73, 75 and 77 may also include its own respective housing 74, 76 and 78.

As will be appreciated by those skilled in the art, one scenario where the adaptor 70 may be especially useful is to adapt a conventional security or other system controller to operate via the data communications bus 30. Since the data bus technology is being slowly phased in by automobile manufacturers, suppliers may provide their conventional systems for conventional vehicles, and add the adaptor 70 with the conventional controller when the vehicle requires interface to the data communications bus 30.

Figure 8:
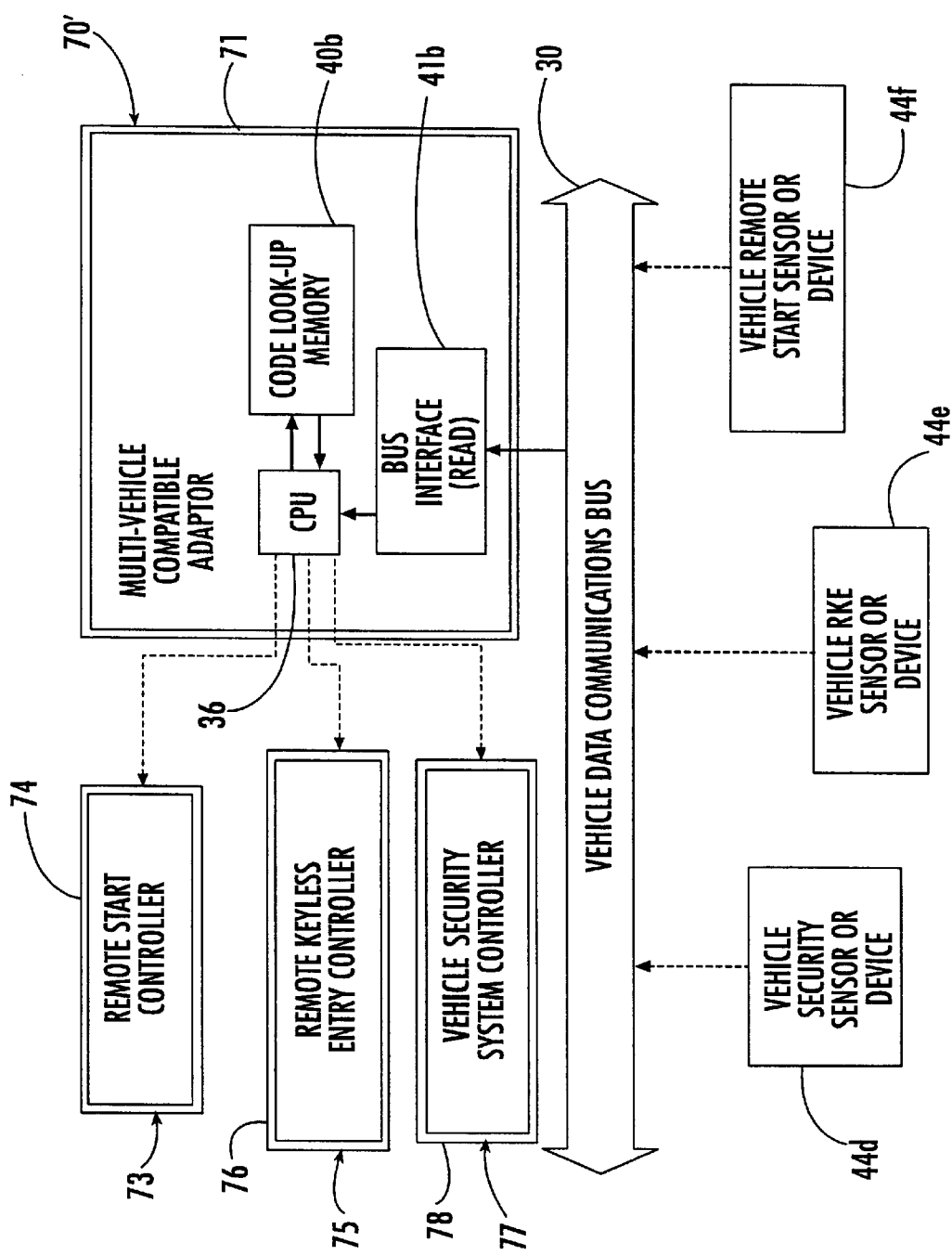
FIG. 8 is a schematic block diagram of a multi-vehicle compatible adaptor in accordance with the present invention and illustrating the read code processing.

Turning now to FIG. 8, it can be seen that similar concepts can be extended to the multi-vehicle compatible adaptor 70' for the other direction of communication, that is, from the data communications bus 30 to one or more of the controllers 73, 75 and 77. The adaptor 70' illustratively includes the CPU 36, bus interface circuit 41b for reading the bus, and the code look-up memory 40b as described above with reference to FIG. 4.

The operation of the multi-vehicle compatible adaptor 70' will be readily understood by those of skill in the art based upon the above provided descriptions relating to FIGS. 4–6 without requiring further discussion herein. Of course, as will be appreciated by those skilled in the art, the adaptors 70, 70' may be used independently, may be used together, or may be combined into a single unit.

Other features relating to vehicle control systems are disclosed in copending patent applications entitled "REMOTE START SYSTEM FOR A VEHICLE HAVING A DATA COMMUNICATIONS BUS AND RELATED METHODS" (attorney docket no. 16635E) and "MULTI-VEHICLE COMPATIBLE CONTROL SYSTEM FOR READING FROM A DATA BUS AND ASSOCIATED METHODS" (attorney docket no. 16635H), the entire disclosures of which are incorporated herein by reference.

Many modifications and other embodiments of the invention will come to the mind of one skilled in the art having the benefit of the teachings presented in the foregoing descriptions and the associated drawings. Accordingly, it is understood that the invention is not to be limited to the illustrated embodiments disclosed, and that other modifications and embodiments are intended to be included within the spirit and scope of the appended claims.

That which is claimed:

1. A control system for a vehicle comprising a data communications bus and at least one vehicle device connected to the data communications bus, the control system comprising:

a transmitter and a receiver for receiving signals from said transmitter; and a multi-vehicle compatible controller at the vehicle and cooperating with said transmitter and receiver, said multi-vehicle compatible controller generating at least one set of command signals on the data communications bus for the at least one vehicle device, the at least one set of command signals comprising at least one working command signal and at least one non-working command signal for a given vehicle to thereby provide command compatibility with a plurality of different vehicles.

2. A control system according to claim 1 wherein the at least one vehicle device comprises a plurality of vehicle devices; and wherein said multi-vehicle compatible controller generates a respective set of command signals for each vehicle device of the plurality thereof.

3. A control system according to claim 1 wherein said multi-vehicle compatible controller generates command signals sequentially.

4. A control system according to claim 1 wherein said multi-vehicle compatible controller generates command signals each representing digitally coded information.

5. A control system according to claim 1 wherein said multi-vehicle compatible controller comprises a memory for storing data relating to the at least one set of command signals.

6. A control system according to claim 1 wherein the at least one vehicle device comprises an alarm indicating device; and wherein the at least one set of command signals is for operating the alarm indicating device.

7. A control system according to claim 1 wherein the at least one vehicle device comprises at least one vehicle door lock actuator; and wherein the at least one set of command signals is for operating the at least one door lock actuator.

8. A control system according to claim 1 where the at least one vehicle device comprises at least one device relating to starting a vehicle engine; and wherein the at least one set of command signals is for operating the at least one vehicle device relating to starting the vehicle engine.

9. A control system according to claim 1 wherein said multi-vehicle compatible controller generates each command signal of the at least one set of command signals a plurality of times.

10. A control system according to claim 1 wherein said multi-vehicle compatible controller comprises:

a controller for generating at least one controller signal; and a multi-vehicle compatible adaptor connected to said controller for generating the at least one set of command signals on the data communications bus responsive to the at least one controller signal.

11. A control system according to claim 10 wherein said controller further comprises a first housing; and said multi-vehicle adaptor comprises a second housing.

12. A control system according to claim 1 wherein said multi-vehicle compatible controller is further for storing a set of device codes for a given vehicle device for a plurality of different vehicles, for reading a device code from the data communications bus, and for determining a match between a read device code and the stored device codes to thereby provide reading compatibility with a plurality of different vehicles.

13. A control system according to claim 1 wherein said transmitter comprises a remote handheld transmitter to be carried by a user when away from the vehicle; and wherein said receiver is at the vehicle.

14. A control system according to claim 1 wherein said transmitter comprises at least a central station transmitter; and wherein said receiver is at the vehicle.

15. A control system according to claim 1 wherein said receiver comprises a remote receiver to be carried by a user when away from the vehicle; and wherein said transmitter is at the vehicle.

16. A control system according to claim 1 wherein said receiver comprises at least a central station transmitter; and wherein said transmitter is at the vehicle.

17. A control system according to claim 1 wherein said transmitter comprises a transponder transmitter to be carried by a user; and wherein said receiver is at the vehicle.

18. An adaptor for adapting a control system for a vehicle to be compatible with a plurality of different vehicles, each vehicle comprising a data communications bus and at least one vehicle device connected thereto, the control system comprising a transmitter and a receiver for receiving signals from the remote transmitter, and a controller cooperating with the transmitter and receiver, the adaptor comprising:

a housing; and a multi-vehicle compatible adaptor circuit mounted in said housing for generating at least one set of command signals on the data communications bus responsive to the controller, the at least one set of command signals comprising at least one working command signal and at least one non-working command signal for a given vehicle to thereby provide command compatibility with a plurality of different vehicles.

19. An adaptor according to claim 18 wherein the at least one vehicle device comprises a plurality of vehicle devices; and wherein said multi-vehicle compatible adaptor circuit generates a respective set of command signals for each vehicle device of the plurality thereof.

20. An adaptor according to claim 18 wherein said multi-vehicle compatible adaptor circuit generates command signals sequentially.

21. An adaptor according to claim 18 wherein said multi-vehicle compatible adaptor circuit generates command signals each representing digitally coded information.

22. An adaptor according to claim 18 wherein said multi-vehicle compatible adaptor circuit comprises a memory for storing data relating to the at least one set of command signals.

23. An adaptor according to claim 18 wherein the at least one vehicle device comprises an alarm indicating device; and wherein the at least one set of command signals is for operating the alarm indicating device.

24. An adaptor according to claim 18 wherein the at least one vehicle device comprises at least one vehicle door lock actuator; and wherein the at least one set of command signals is for operating the at least one door lock actuator.

25. An adaptor according to claim 18 wherein the at least one vehicle device comprises at least one device relating to starting a vehicle engine; and wherein the at least one set of command signals is for operating the at least one vehicle device relating to starting the vehicle engine.

26. An adaptor according to claim 18 wherein said multi-vehicle compatible adaptor circuit generates each command signal of the at least one set of command signals a plurality of times.

27. An adaptor according to claim 18 wherein said multi-vehicle compatible adaptor circuit is further for storing a set of device codes for a given vehicle device for a plurality of different vehicles, for reading a device code from the data communications bus, and for determining a match between a read device code and the stored device codes to thereby provide reading compatibility with a plurality of different vehicles.

28. A control method for a vehicle comprising a data communications bus and at least one vehicle device connected to the data communications bus, the method comprising:

generating at least one set of command signals on the data communications bus for the at least one vehicle device, the at least one set of command signals comprising at least one working command signal and at least one non-working command signal for a given vehicle to thereby provide command compatibility with a plurality of different vehicles.

29. A method according to claim 28 further comprising receiving a signal from a transmitter; and wherein generating the at least one set of command signals is responsive to receiving the signal from the transmitter.

30. A method according to claim 29 wherein the transmitter comprises a handheld remote transmitter to be carried by a user when away from the vehicle.

31. A method according to claim 29 wherein the transmitter comprises at least a central station transmitter.

32. A method according to claim 29 wherein the transmitter comprises a handheld transponder to be carried by a user when away from the vehicle.

33. A method according to claim 28 wherein the at least one vehicle device comprises a plurality of vehicle devices; and further comprising generating a respective set of command signals for each vehicle device of the plurality thereof.

34. A method according to claim 28 wherein the command signals are generated sequentially.

35. A method according to claim 28 the command signals each represent digitally coded information.

36. A method according to claim 28 further comprising storing in a memory data relating to the at least one set of command signals.

37. A method according to claim 28 wherein the at least one vehicle device comprises an alarm indicating device; and wherein the at least one set of command signals is for operating the alarm indicating device.

38. A method according to claim 28 wherein the at least one vehicle device comprises at least one vehicle door lock actuator; and wherein the at least one set of command signals is for operating the at least one door lock actuator.

39. A method according to claim 28 where the at least one vehicle device comprises at least one device relating to starting a vehicle engine; and wherein the at least one set of command signals is for operating the at least one vehicle device relating to starting the vehicle engine.

40. A method according to claim 28 wherein each command signal of the at least one set of command signals is generated a plurality of times.

41. A method according to claim 28 further comprising:

storing a set of device codes for a given vehicle device for a plurality of different vehicles;

reading a device code from the data communications bus; and determining a match between a read device code and the stored device codes to thereby provide reading compatibility with a plurality of different vehicles.

42. A method for adapting a control system for a vehicle to be compatible with plurality of different vehicles, each vehicle comprising a data communications bus and at least one vehicle device connected to the data communications bus, the control system comprising a transmitter and a receiver for receiving signals from the transmitter, and a controller cooperating with the transmitter and receiver, the method comprising:

monitoring an output of the controller; and generating at least one set of command signals on the data communications bus responsive to the output of the controller, the at least one set of command signals comprising at least one working command signal and at least one non-working command signal for a given vehicle to thereby provide command compatibility with a plurality of different vehicles.

43. A method according to claim 42 wherein the at least one vehicle device comprises a plurality of vehicle devices; and further comprising generating a respective set of command signals for each vehicle device of the plurality thereof.

44. A method according to claim 42 wherein the command signals are generated sequentially.

45. A method according to claim 42 wherein the command signals each represent digitally coded information.

46. A method according to claim 42 further comprising storing in a memory data relating to the at least one set of command signals.

47. A method according to claim 42 wherein the at least one vehicle device comprises an alarm indicating device; and wherein the at least one set of command signals is for operating the alarm indicating device.

48. A method according to claim 42 wherein the at least one vehicle device comprises at least one vehicle door lock actuator; and wherein the at least one set of command signals is for operating the at least one door lock actuator.

49. A method according to claim 42 where the at least one vehicle device comprises at least one device relating to starting a vehicle engine; and wherein the at least one set of command signals is for operating the at least one vehicle device relating to starting the vehicle engine.

50. A method according to claim 42 wherein each command signal of the at least one set of command signals is generated a plurality of times.

51. A method according to claim 42 further comprising:
storing a set of device codes for a given vehicle device for a plurality of different vehicles;
reading a device code from the data communications bus; and
determining a match between a read device code and the stored device codes to thereby provide reading compatibility with a plurality of different vehicles reading signals on the data communications bus.

* * * * *